United States Patent
Do et al.

(10) Patent No.: US 8,610,924 B2
(45) Date of Patent: Dec. 17, 2013

(54) SCANNING AND CAPTURING DIGITAL IMAGES USING LAYER DETECTION

(75) Inventors: Lydia M. Do, Raleigh, NC (US); Pamela A. Nesbitt, Tampa, FL (US); Lisa S. DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/624,753

(22) Filed: Nov. 24, 2009

(65) Prior Publication Data

US 2011/0122432 A1    May 26, 2011

(51) Int. Cl.
| | |
|---|---|
| H04N 1/04 | (2006.01) |
| H04N 1/46 | (2006.01) |
| G06K 15/02 | (2006.01) |
| H04N 1/00 | (2006.01) |
| G03G 15/34 | (2006.01) |

(52) U.S. Cl.
USPC .......... 358/1.15; 358/474; 358/505; 358/501; 358/1.2; 358/513; 399/371; 399/183; 399/220; 399/81

(58) Field of Classification Search
USPC ............ 358/474, 1.2, 501, 453, 468; 399/371
See application file for complete search history.

(56) References Cited

U.S. PATENT DOCUMENTS

| | | |
|---|---|---|
| 3,873,769 A | 3/1975 | Cotter |
| 4,393,410 A | 7/1983 | Ridge et al. |
| 4,538,182 A | 8/1985 | Saito et al. |
| 4,577,058 A | 3/1986 | Collins |
| 4,687,317 A * | 8/1987 | Appel et al. .................. 399/183 |
| 4,751,583 A | 6/1988 | Levine |
| 4,771,336 A | 9/1988 | Ohtorii |
| 4,987,497 A | 1/1991 | Yoshimura |
| 5,075,787 A | 12/1991 | Shaughnessy et al. |
| 5,103,490 A | 4/1992 | McMillin |
| 5,259,041 A | 11/1993 | Kato et al. |
| 5,465,155 A | 11/1995 | Edgar |
| 5,465,156 A | 11/1995 | Edgar |
| 5,574,577 A | 11/1996 | Wally, Jr. et al. |
| 5,630,168 A | 5/1997 | Rosebrugh et al. |
| 5,781,668 A | 7/1998 | Starkweather |
| 5,838,326 A | 11/1998 | Card et al. |
| 6,014,662 A | 1/2000 | Moran et al. |
| 6,373,602 B1 | 4/2002 | Kohler et al. |

(Continued)

FOREIGN PATENT DOCUMENTS

| | | |
|---|---|---|
| DE | 19804028 A1 | 8/1998 |
| EP | 0450196 A1 | 10/1991 |

(Continued)

OTHER PUBLICATIONS

U.S. Appl. No. 11/868,513, filed Oct. 7, 2007, Do et al.

(Continued)

*Primary Examiner* — Akwasi M Sarpong
(74) *Attorney, Agent, or Firm* — Yee & Associates, P.C.; Jeffrey S. LaBaw

(57) ABSTRACT

A mechanism for scanning and capturing digital images using document layer detection. Upon detecting a document placed on a scanning surface of a scanning device, the illustrative embodiments identify one or more layers within the document. The illustrative embodiments then scan the one or more layers within the document on a layer by layer basis.

17 Claims, 4 Drawing Sheets

(56) References Cited

U.S. PATENT DOCUMENTS

| | | |
|---|---|---|
| 6,493,115 B1 | 12/2002 | Kanno et al. |
| 6,561,422 B1 | 5/2003 | Cariffe |
| 6,561,678 B2 | 5/2003 | Loughrey |
| 6,571,279 B1 | 5/2003 | Herz et al. |
| 6,581,104 B1 | 6/2003 | Bereiter |
| 6,636,831 B1 | 10/2003 | Profit, Jr. et al. |
| 6,646,765 B1 | 11/2003 | Barker et al. |
| 6,696,692 B1 * | 2/2004 | Pepper .................... 250/492.21 |
| 6,708,176 B2 | 3/2004 | Strunk et al. |
| 6,751,780 B1 | 6/2004 | Neff et al. |
| 6,753,981 B1 * | 6/2004 | Park .............................. 358/474 |
| 6,806,636 B2 | 10/2004 | Kang et al. |
| 6,839,669 B1 | 1/2005 | Gould et al. |
| 6,850,252 B1 | 2/2005 | Hoffberg |
| 6,894,715 B2 | 5/2005 | Henrikson |
| 6,915,626 B2 | 7/2005 | Carton |
| 6,924,741 B2 | 8/2005 | Tamayama et al. |
| 6,938,203 B1 | 8/2005 | Dimarco et al. |
| 6,970,607 B2 | 11/2005 | Jia et al. |
| 6,970,821 B1 | 11/2005 | Shambaugh et al. |
| 6,981,649 B2 | 1/2006 | Jaeger et al. |
| 6,999,932 B1 | 2/2006 | Zhou |
| 7,002,712 B2 | 2/2006 | Barker et al. |
| 7,035,804 B2 | 4/2006 | Saindon et al. |
| 7,079,293 B2 | 7/2006 | Risheq |
| 7,148,998 B2 | 12/2006 | Baggs et al. |
| 7,174,056 B2 | 2/2007 | Silverbrook et al. |
| 7,177,931 B2 | 2/2007 | Athey et al. |
| 7,194,217 B2 | 3/2007 | Hosoi |
| 7,200,280 B2 | 4/2007 | Enomoto |
| 7,200,576 B2 | 4/2007 | Steeves et al. |
| 7,209,124 B2 | 4/2007 | Hunt et al. |
| 7,236,653 B2 | 6/2007 | Constantin et al. |
| 7,257,531 B2 | 8/2007 | Holub |
| 7,290,950 B2 | 11/2007 | Donahoe et al. |
| 7,373,590 B2 | 5/2008 | Woolf et al. |
| 7,383,307 B2 | 6/2008 | Kirkland et al. |
| 7,401,297 B2 | 7/2008 | Hori et al. |
| 7,441,706 B1 | 10/2008 | Schuessler et al. |
| 7,447,378 B2 * | 11/2008 | Kondo et al. ................. 382/266 |
| 7,450,086 B2 | 11/2008 | Thielman et al. |
| 7,457,012 B2 * | 11/2008 | Fang ............................. 358/498 |
| 7,466,873 B2 | 12/2008 | Eschbach et al. |
| 7,475,110 B2 | 1/2009 | Kirkland et al. |
| 7,493,566 B2 | 2/2009 | Nakajima et al. |
| 7,519,222 B2 | 4/2009 | Kisilev et al. |
| 7,533,349 B2 | 5/2009 | Saul et al. |
| 7,535,489 B2 | 5/2009 | Nonaka et al. |
| 7,565,330 B2 | 7/2009 | Steeves et al. |
| 7,567,908 B2 | 7/2009 | Bodin et al. |
| 7,577,295 B2 | 8/2009 | Constantin et al. |
| 7,599,517 B2 | 10/2009 | Kogure et al. |
| 7,649,525 B2 | 1/2010 | Chen et al. |
| 7,710,391 B2 | 5/2010 | Bell et al. |
| 7,742,197 B2 | 6/2010 | Takiyama et al. |
| 7,743,348 B2 | 6/2010 | Robbins et al. |
| 7,765,229 B2 | 7/2010 | Samji et al. |
| 7,784,087 B2 | 8/2010 | Yami et al. |
| 7,817,297 B2 | 10/2010 | Ushida et al. |
| 7,830,408 B2 | 11/2010 | Asthana et al. |
| 7,856,477 B2 | 12/2010 | Libbey et al. |
| 7,870,493 B2 | 1/2011 | Pall et al. |
| 7,877,707 B2 | 1/2011 | Westerman et al. |
| 7,911,453 B2 | 3/2011 | Wilson et al. |
| 7,916,946 B2 | 3/2011 | Hanano |
| 7,924,477 B1 | 4/2011 | Malzbender et al. |
| 7,929,805 B2 | 4/2011 | Wang et al. |
| 7,937,319 B2 | 5/2011 | Kennis et al. |
| 7,970,870 B2 | 6/2011 | Hinckley et al. |
| 7,975,065 B2 | 7/2011 | Dunning et al. |
| 8,009,147 B2 | 8/2011 | Chang et al. |
| 8,019,127 B2 | 9/2011 | Misra |
| 8,022,941 B2 | 9/2011 | Smoot |
| 8,023,766 B1 | 9/2011 | Bergman et al. |
| 8,063,888 B2 | 11/2011 | McFarlane et al. |
| 8,085,323 B2 | 12/2011 | Tanaka et al. |
| 8,094,129 B2 | 1/2012 | Izadi et al. |
| 8,102,575 B2 | 1/2012 | Hattori |
| 8,139,036 B2 | 3/2012 | Do et al. |
| 2002/0031282 A1 | 3/2002 | Ideyama |
| 2002/0178190 A1 | 11/2002 | Pope et al. |
| 2003/0066073 A1 | 4/2003 | Rebh |
| 2003/0126162 A1 | 7/2003 | Yohe et al. |
| 2003/0160862 A1 | 8/2003 | Charlier et al. |
| 2003/0204403 A1 | 10/2003 | Browning |
| 2003/0208598 A1 | 11/2003 | Athey et al. |
| 2003/0231801 A1 | 12/2003 | Baggs et al. |
| 2004/0004733 A1 * | 1/2004 | Barker et al. ................. 358/1.13 |
| 2004/0130750 A1 | 7/2004 | Ushida et al. |
| 2004/0139391 A1 | 7/2004 | Stumbo et al. |
| 2004/0190772 A1 | 9/2004 | Constantin et al. |
| 2004/0196503 A1 | 10/2004 | Kurtenbach et al. |
| 2004/0224674 A1 | 11/2004 | O'Farrell et al. |
| 2005/0111894 A1 * | 5/2005 | Hosoi ........................... 399/371 |
| 2005/0149364 A1 | 7/2005 | Ombrellaro |
| 2005/0182680 A1 | 8/2005 | Jones, III et al. |
| 2005/0183023 A1 | 8/2005 | Maruyama et al. |
| 2005/0231767 A1 | 10/2005 | Brake et al. |
| 2006/0036944 A1 | 2/2006 | Wilson |
| 2006/0048224 A1 | 3/2006 | Duncan et al. |
| 2006/0073891 A1 | 4/2006 | Holt |
| 2006/0117669 A1 | 6/2006 | Baloga et al. |
| 2006/0126128 A1 | 6/2006 | Ahmed et al. |
| 2006/0158703 A1 | 7/2006 | Kisilev et al. |
| 2006/0176524 A1 | 8/2006 | Willrich |
| 2006/0209363 A1 | 9/2006 | Suenaga et al. |
| 2006/0212486 A1 | 9/2006 | Kennis et al. |
| 2006/0267966 A1 | 11/2006 | Grossman et al. |
| 2007/0026372 A1 | 2/2007 | Huelsbergen |
| 2007/0055929 A1 | 3/2007 | Giannetti et al. |
| 2007/0083666 A1 | 4/2007 | Apelbaum |
| 2007/0143624 A1 | 6/2007 | Steeves |
| 2007/0156811 A1 | 7/2007 | Jain et al. |
| 2007/0220444 A1 | 9/2007 | Sunday et al. |
| 2007/0239471 A1 | 10/2007 | Patton et al. |
| 2008/0019746 A1 | 1/2008 | Takiyama et al. |
| 2008/0028321 A1 | 1/2008 | Weksler et al. |
| 2008/0052319 A1 | 2/2008 | Dunning et al. |
| 2008/0127302 A1 | 5/2008 | Qvarfordt et al. |
| 2008/0131946 A1 | 6/2008 | Pichersky et al. |
| 2008/0137157 A1 | 6/2008 | Bannai |
| 2008/0192059 A1 | 8/2008 | Kennedy |
| 2008/0214233 A1 | 9/2008 | Wilson et al. |
| 2008/0270230 A1 | 10/2008 | Hendrickson et al. |
| 2008/0281851 A1 | 11/2008 | Izadi et al. |
| 2008/0288862 A1 | 11/2008 | Smetters et al. |
| 2009/0003649 A1 | 1/2009 | Wakabayashi |
| 2009/0091529 A1 | 4/2009 | Do et al. |
| 2009/0091539 A1 | 4/2009 | Do et al. |
| 2009/0094515 A1 | 4/2009 | Do et al. |
| 2009/0094561 A1 | 4/2009 | Do et al. |
| 2009/0113294 A1 | 4/2009 | Sanghavi et al. |
| 2009/0138723 A1 | 5/2009 | Nyang et al. |
| 2009/0150983 A1 | 6/2009 | Saxena et al. |
| 2009/0150986 A1 | 6/2009 | Foreman |
| 2009/0232409 A1 | 9/2009 | Marchesotti |
| 2009/0262380 A1 | 10/2009 | Puigardeu et al. |
| 2009/0328163 A1 | 12/2009 | Preece |
| 2010/0020365 A1 | 1/2010 | Do et al. |
| 2010/0189345 A1 | 7/2010 | Reddy et al. |
| 2011/0066573 A1 | 3/2011 | Fijnvandraat |
| 2011/0069357 A1 | 3/2011 | Austin et al. |
| 2011/0122458 A1 | 5/2011 | Do et al. |
| 2011/0122459 A1 | 5/2011 | Do et al. |

FOREIGN PATENT DOCUMENTS

| | | |
|---|---|---|
| EP | 0543566 A2 | 5/1993 |
| EP | 1315071 A1 | 5/2003 |
| EP | 1621989 A2 | 2/2006 |
| JP | 62066280 A | 3/1987 |
| JP | 62122459 A | 6/1987 |
| JP | 62266964 | 11/1987 |
| JP | 63182770 A | 7/1988 |

(56) References Cited

FOREIGN PATENT DOCUMENTS

| JP | 2000148396 | A  | 5/2000  |
|----|------------|----|---------|
| JP | 2006139615 | A  | 6/2006  |
| JP | 2006180260 | A  | 7/2006  |
| JP | 2007148820 | A  | 6/2007  |
| JP | 2007265149 | A  | 10/2007 |
| WO | 0101391    | A1 | 1/2001  |
| WO | 03036415   | A2 | 5/2003  |
| WO | 2004068421 | A2 | 8/2004  |
| WO | WO2005/052720 | A2 | 6/2005 |

OTHER PUBLICATIONS

U.S. Appl. No. 12/178,294, filed Jul. 23, 2008, Do et al.
USPTO Final Office Action dated Oct. 18, 2011 for U.S. Appl. No. 11/868,474, 17 Pages.
USPTO Final Office Action dated Dec. 10, 2010 for U.S. Appl. No. 11/869,313, 22 Pages.
USPTO Final Office Action dated Dec. 9, 2010 for U.S. Appl. No. 11/868,766, 18 Pages.
USPTO Final Office Action dated Mar. 1, 2011 for U.S. Appl. No. 11/868,474, 18 Pages.
USPTO Final Office Action dated Mar. 3, 2011 for U.S. Appl. No. 11/868,216, 13 Pages.
USPTO Final Office Action dated May 24, 2011 for U.S. Appl. No. 11/869,313, 18 Pages.
USPTO Final Office Action dated Aug. 4, 2011 for U.S. Appl. No. 11/868,766, 15 Pages.
USPTO Notice of Allowance dated May 16, 2011 for U.S. Appl. No. 11/869,987, 7 Pages.
USPTO Office Action dated Jan. 28, 2011 for U.S. Appl. No. 11/869,313, 12 Pages.
USPTO Office Action dated Oct. 15, 2010 for U.S. Appl. No. 11/950,872, 10 Pages.
USPTO Office Action dated Oct. 29, 2010 for U.S. Appl. No. 11/868,474, 19 Pages.
USPTO Office Action dated Nov. 30, 2010 for U.S. Appl. No. 11/869,987, 8 Pages.
USPTO Office Action dated Dec. 10, 2010 for U.S. Appl. No. 11/868,513, 17 Pages.
USPTO Office Action dated Apr. 14, 2011 for U.S. Appl. No. 11/868,766, 14 Pages.
USPTO Office Action dated Jun. 23, 2011 for U.S. Appl. No. 11/868,474, 16 Pages.
USPTO Office Action dated Aug. 20, 2010 for U.S. Appl. No. 11/868,216, 11 Pages.
USPTO Office Action dated Aug. 3, 2011 for U.S. Appl. No. 11/868,216, 11 Pages.
USPTO Office Action dated Aug. 5, 2010 for U.S. Appl. No. 11/869,313, 17 Pages.
USPTO Office Action dated Aug. 6, 2010 for U.S. Appl. No. 11/868,513, 19 Pages.
USPTO Office Action dated Aug. 6, 2010 for U.S. Appl. No. 11/868,766, 18 Pages.
PCT Search Report dated Dec. 29, 2008, regarding International Application No. PCT/EP2008063007, 2 Pages.
PCT Search Report dated Feb. 5, 2009, regarding International Application No. PCT/EP2008063006, 3 Pages.
Gronbaek et al., "iGameFloor—A Platform for Co-Located Collaborative Games," Proceedings of the international Conference on Advances in Computer Entertainment Technology, ACE '07, Jun. 2007, vol. 203, pp. 1-8.
Bollacker et al., "A System for Automatic Personalized Tracking of Scientific Literature on the Web," Proceedings of the Fourth ACM Conference on Digital Libraries, Aug. 1999, pp. 105-113.
Augsten et al., "Multitoe: High Precision Interaction with Back-Projected Floors Based on High-Resolution Multi-Touch Input," UIST '10 Proceedings of the 23nd annual ACM symposium on User interface software and technology, Oct. 2010, 10 pps.
Athanasopouloos et al., "Enhanced CAPTCHAs: Using Animation to tell Humans and Computers Apart", Communications and Multimedia Security LNCS (2006), vol. 4237, pp. 97-108.
Izadi et al., "Dynamo: A public interactive surface supporting cooperative sharing and exchange of media", UIST 2003 Proceedings of the 16th annual ACM symposium on User interface software and technology, Chi Letters, vol. 5, Iss. 2, Nov. 2003, pp. 159-168.
Bohte et al., "Market-Based Recommendation: Agents that Compete for Consumer Attention", ACM Transactions on Internet Technology, vol. 4, No. 4, Nov. 2004, 29 Pages.
Lemon et al., "Multithreaded Context for Robust Conversational Interfaces: Context-Sensitive Speech Recognition and Interpretation of Corrective Fragments", ACM Transactions on Computer-Human Interaction, Sep. 2004, vol. 11, No. 3, 27 Pages.
Gabriel et al., "Conscientious Software", ACM 1-59593-348-4/06/0010, Sun Microsystems, Inc., Oct. 2006, 18 Pages.
McTear, "Spoken Dialogue Technology: Enabling the Conversational User Interface", ACM Computing Surveys, vol. 34, No. 1, Mar. 2002, 97 Pages.
Jagadish et al., "Making Database Systems Usable", SIGMOD '07, ACM 978-1-59593-686-8/07/0006, Mar. 2002, vol. 34, No. 1, 12 Pages.
Ashdown et al., "Escritoire: A Personal Projected Display", IEEE Multimedia, vol. 12, Issue 1, Jan.-Mar. 2005, pp. 34-42.
Marshall et al., "Exploring the Relationship Between Personal and Public Annotations", Proceedings of the 4th ACM/IEEE-CS Joint Conference on Digital Libraries (JCDL '04), Jun. 2004, 9 Pages.
Microsoft: "Microsoft Launches New Product Category: Surface Computing Comes to Life in Restaurants, Hotels, Retail Locations and Casino Resorts", Microsoft News Center, Microsoft Website, May 2007, 3 Pages.
USPTO Final Office Action dated Feb. 18, 2011 for U.S. Appl. No. 11/950,872, 18 Pages.
PCT Search Report dated Jan. 29, 2008, regarding International Application No. PCT/EP2008063005, 3 Pages.
USPTO Final Office Action dated Apr. 15, 2011 for U.S. Appl. No. 11/868,513, 11 Pages.
USPTO Office Action dated Jul. 28, 2011 for U.S. Appl. No. 11/868,513, 12 Pages.
USPTO Final Office Action dated Jan. 20, 2012 for U.S. Appl. No. 11/868,216, 13 Pages.
USPTO Office Action dated Jun. 9, 2011 for U.S. Appl. No. 12/178,294, 12 Pages.
USPTO Office Action dated Dec. 16, 2011 for U.S. Appl. No. 11/178,294, 7 Pages.
USPTO Notice of Allowance dated Dec. 5, 2011 for U.S. Appl. No. 11/868,513, 13 Pages.
USPTO Office Action dated Feb. 9, 2012 for U.S. Appl. No. 12/624,735, 35 Pages.
USPTO Office Action dated Feb. 16, 2012 for U.S. Appl. No. 12/624,763, 34 Pages.
USPTO Notice of Allowance dated Aug. 24, 2012 for U.S. Appl. No. 12/624,735, 11 pages.
USPTO Final Office Action dated Jun. 20, 2012 for U.S. Appl. No. 12/624,763, 37 pages.
USPTO Non-Final Office Action dated Jun. 14, 2012 for U.S. Appl. No. 12/353,329, 21 pages.
USPTO Non-Final Office Action dated Oct. 27, 2011 for U.S. Appl. No. 12/353,329, 22 pages.
Notice of allowance dated Jan. 24, 2013 regarding U.S. Appl. No. 12/178,294, 17 pages.
Final office action dated Jan. 7, 2013 regarding U.S. Appl. No. 12/353,329, 51 pages.
Notice of allowance dated Jan. 4, 2013 regarding U.S. Appl. No. 12/624,735, 16 pages.

\* cited by examiner

SCANNING AND CAPTURING DIGITAL IMAGES USING LAYER DETECTION

BACKGROUND OF THE INVENTION

1. Field

The illustrative embodiments relate generally to a document scanning system and in particular to scanning and capturing digital images using document layer detection.

2. Description of the Related Art

Scanners are an important part of a word processing and/or personal computer environment. A scanner is a device that optically scans printed or handwritten paper documents, objects, and photographs and creates digital images. One example of a scanner is a desktop or flatbed scanner that comprises a glass window on which a document is placed. A light positioned under the glass window is moved across the document to capture a digital image of the document and store the image in memory. With the digital image in memory, the image may be displayed, copied, transferred, printed, or altered as desired.

Scanning software, called a driver, is utilized to capture an image of a document. TWAIN is a common software language that scanner manufacturers use to communicate with scanners. The TWAIN driver acts as an interpreter between any application that supports the TWAIN standard and the scanner. The user configures the controls provided by the TWAIN driver to specify the scanning mode (e.g., color or black and white), the scanning resolution (e.g. 100 dpi or 200 dpi), the area on the flatbed glass window to be scanned, and other scanning characteristics, such as desired tonal quality and color balance of the scanned image. Once a document that has been placed on the glass window has been scanned, the TWAIN driver transfers the scanned image into memory.

After the images are stored in memory, a user may need to edit a scanned image because the image contains unwanted or irrelevant detail. A user may edit the scanned image using a graphics editing software product such as Adobe® Photoshop®. The graphics editing software enables a user to remove unwanted detail by cropping the image. Cropping refers to removing unnecessary or unwanted portions of the image, thereby improving the overall composition of the document.

SUMMARY

The illustrative embodiments provide a mechanism for scanning and capturing digital images using document layer detection. Upon detecting a document placed on a scanning surface of a scanning device, the illustrative embodiments identify one or more layers within the document. The illustrative embodiments then scan the one or more layers within the document on a layer by layer basis.

DETAILED DESCRIPTION

Figure 1:
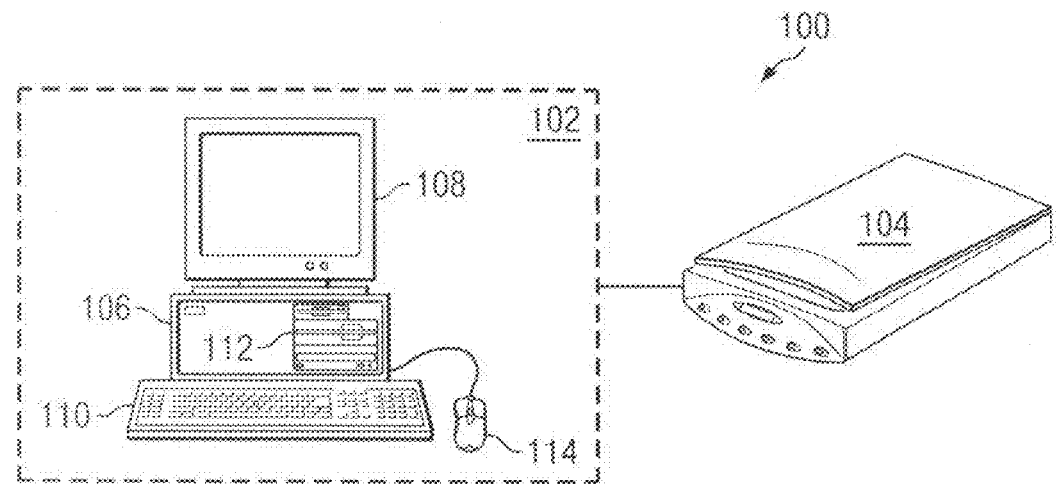
FIG. 1 is a block diagram of an exemplary document scanning system for capturing a digital image of an object in accordance with the illustrative embodiments.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the aspects of the disclosure may be written in any combination of one or more programming languages, including an object oriented programming language such as Java, Smalltalk, C++, Voice eXtensible Markup Language (VXML) or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The scanner of the illustrative embodiments allows for capturing a digital image of a document based on layer detection. A layer is defined as an area of a document which comprises features having a specific depth of field, color, or content. Photographs are one example of documents that may contain various depth of field features. Consider, for example, a photograph of a person standing in front of a city skyline. A layer in the photograph may comprise the foreground containing objects located close to the camera (e.g., the person). Similarly, another layer in the photograph may comprise the background containing objects located far from the camera (e.g., the skyline). Documents may also comprise various color variations, wherein each color in the document may be identified as a separate layer of the document. Documents may also comprise a combination of text and graphics, wherein the text portion of the document is identified as one layer and the graphics portion of the document is identified as a separate layer. Documents may also comprise multiple-exposed photographs, wherein the film was exposed to two different images at different times. Each image in a multiple-exposed photograph may be identified as a separate layer. In addition, the document itself may be constructed of a plurality of separate physical layers. For example, the document may comprise an amalgam of one photograph placed over a portion of another photograph, in which the individual photographic images were taken at separate points in time. In another example, the document may comprise an amalgam of a transparent overlay placed on top of a document. The transparent overlay may comprise text or graphical images created separately from the text or graphical images on the document. In a further example, the document may comprise an amalgam of an opaque overlay placed on top of portions of a document, wherein the opaque overlay covers up unwanted sections of the document.

The scanner in the illustrative embodiments may employ existing depth edge detection technology to allow for scanning and capturing separate layers of a document. One example of such technology is multi-flash imaging. Multi-flash is currently employed within a camera to detect color variations, differences in shape, and depth discontinuities. The scanner in the illustrative embodiments may detect the shadows around objects that are created using existing lighting and depth edge detection technology such as multi-flash to identify different layers within a document for scanning. When a user places a document onto the scanning surface of the scanning device, the scanning software in the scanner detects the lighting (i.e., exposure) of objects within the document to determine the individual layers (e.g., foreground, background, etc.) The scanning software also may detect shadows formed from the individual layers of the document. For example, using a multi-flash camera, a photograph taken of a subject in front of a background will comprise shadows around the subject. The scanning software may detect the shadow around the subject and capture the subject as one layer of the document. The scanning software may also capture the background outside of the object's shadow as a separate layer. These individual layers are stored as separate files in memory. Alternatively, the scanning software may be configured to scan only specific portions or layers of the document as indicated by the user. For instance, the user may instruct the software to scan only the foreground layer of a document by configuring the software to capture the portion of the document in which the light exposure on the objects in the document is higher (e.g. due to use of a flash) than the rest of the document. If the scanning software is configured to scan all of the layers in the document separately, the scanning software may scan the layers in a particular order or in particular grouping of layers. For instance, as the brightness in parts of a photograph may vary, the scanning software may be configured to scan layers of a photograph in order of highest exposure to lowest exposure, or ice versa. In another example, the scanning software may be configured to scan layers of a photograph in order of proper exposure. Layers comprising adequate exposures are scanned first, while layers comprising "blown-out highlights" (extremely bright portions of the photograph) or "crushed blacks" (extremely dark portions of the photograph) or other unrecoverable areas are scanned last or eliminated from the scanning process altogether. Thus, the illustrative embodiments comprise a scanning process that allows a document to be edited while the document is being scanned, rather than editing the digital image of the document after the document has already been scanned in its entirety.

In another embodiment of the layer detection process, the user may instruct the software to scan portions of the document that contain a specific color. In this embodiment, a UV application may be employed in the scanner to analyze and detect the wavelengths of light reflected from the document. If the UV application locates a desired wavelength reflected in the document (e.g., the wavelength for the color blue), the scanning software may be instructed to capture only those portions of the document that the UV application has identified as comprising the specified color. Alternatively, the scanning software may be configured to scan all of the detected layers of color in the document, but on a layer by layer basis. In a further embodiment, the user may configure the scanning software to identify layers in the document based on the type of document content. For instance, if the document contains text and graphics, the user may specify that the scanning software scan as a separate layer only the text portion of the document, and not the graphics portion of the document.

With reference now to the figures and in particular with reference to FIG. 1, a pictorial representation of an exemplary document scanning system for capturing a digital image of an object in accordance with the illustrative embodiments is shown. In this illustrative example, data processing system 100 comprises a computer 102 and a scanning device 104. Computer 102 includes system unit 106, video display terminal 108, keyboard 110, storage unit 112, which may include floppy drives and other types of permanent and removable storage media, and mouse 114. Additional input devices may be included with computer 102, such as, for example, a joystick, touchpad, touch screen, trackball, microphone, and the like. Computer 102 may be implemented using any suitable computer, such as an IBM® eServer® computer or IntelliStation® computer, which are products of IBM Corporation, located in Armonk, N.Y. Although the depicted representation shows a computer, other embodiments of the present invention may be implemented in other types of data processing systems, such as a network computer. Computer 102 may also include a graphical user interface (GUI) that may be implemented by means of systems software residing in computer readable media in operation within computer 102.

Scanning device 104 may be connected to computer 102 via wire links, wireless communication links, or fiber optic cables. In the depicted example, scanning device 104 is a flatbed scanner that comprises a glass window. When a document is placed on the glass window, a light positioned under the glass window is moved across the document to capture a digital image of the document and store the image in memory. The portions of the document that are actually captured by scanning device 104 in accordance with the illustrative embodiments are described in further detail in FIGS. 3-5.

Figure 2:
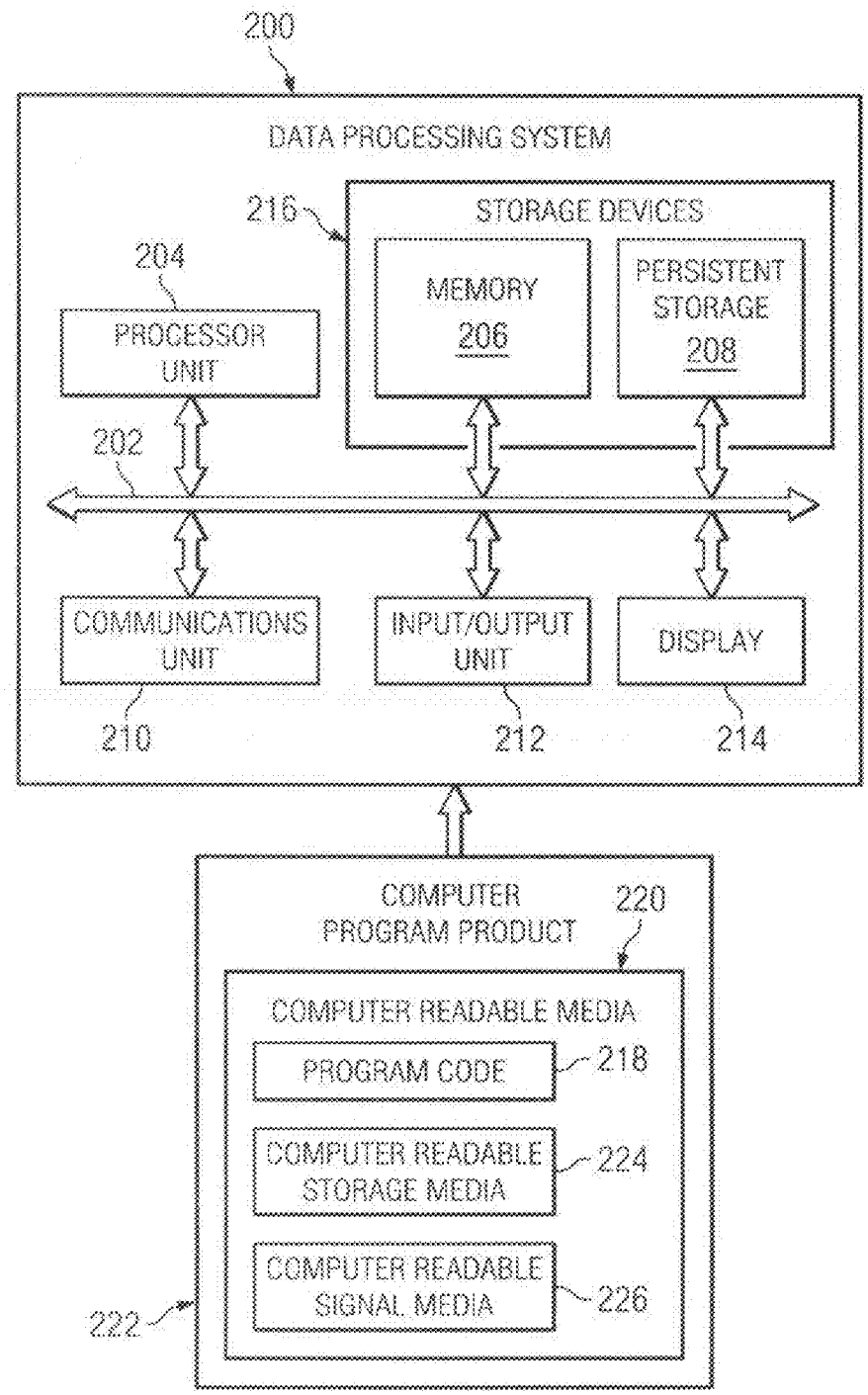
FIG. 2 is a block diagram of an exemplary data processing system with which the illustrative embodiments may be implemented.

Turning now to FIG. 2, a block diagram of an exemplary data processing system with which the illustrative embodiments may be implemented. Data processing system 200 is an example of a computer, such as computer 102 shown in FIG. 1 or computer 308 in FIG. 3, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Within memory 206 or persistent storage 208, computer program instructions for an object display application for displaying an image of an object placed on the surface of scanning device 104 in FIG. 1 are provided. The object display application may operate generally for displaying an image on display 214 of an object placed on the scanning device by: detecting an object placed on the scanning surface, identifying a region of the surface upon which the object is placed, scanning, using the scanner, the identified region of the surface to create an object image of the object, and rendering the object image within the identified region. The object placed on the scanning surface may be implemented as a pictorial document such as a photograph or other printed graphic image, a text document, a hand, a portable computing device, or any other object as will occur to those of skill in the art.

In addition, a set of computer program instructions for a scanner device driver for operating scanner 104 in FIG. 1 is also provided within persistent storage 208 and is loaded into memory 206. The scanner device driver comprises scanning software that exposes an application programming interface ('API') to the object display application that may be used to scan a region of the scanning surface to create an image of any objects placed in the region. The scanner device driver may be implemented in any number of ways and provide a variety of interfaces as will occur to those of skill in the art, including those according to the TWAIN specification promulgated by the TWAIN Working Group, the Image and Scanner Interface Specification ('ISIS') developed by Pixel Translations, the Scanner Access Now Easy ('SANE') specification, and so on.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications fink. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
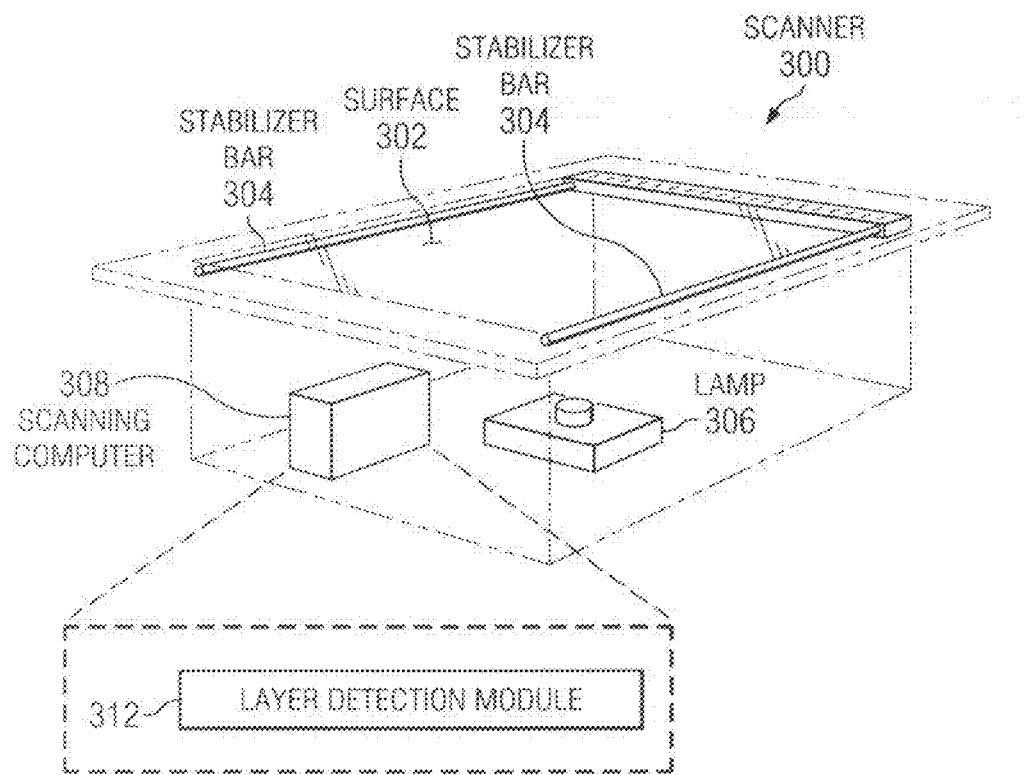
FIG. 3 is a block diagram of a scanning device with which the illustrative embodiments may be implemented.

FIG. 3 is a block diagram of a scanning device with which the illustrative embodiments may be implemented. Scanner 300 is a device that captures a digital image of an object. In this illustrative example, scanner 300 is implemented using a charged-coupled device ('CCD') array. The CCD array is a collection of tiny light-sensitive diodes, which convert photons into electrons. Each diode is called a photosite and is sensitive to light—the brighter the light that hits a single photosite, the greater the electrical charge that will accumulate at that site. The image of the object scanned reaches the CCD array through a series of mirrors, filters and lenses. The exact configuration of these components will vary from one embodiment to another. Scanner 300 includes one or more lamps 306 to illuminate the object. The lamps may be implemented using cold cathode fluorescent lamps ('CCFL'), xenon lamps, standard fluorescent lamps, diodes, or any other implementation as will occur to those of skill in the art. The size and number of lamps may be configured in scanner 300 in any number of ways as will occur to those of skill in the art to provide varying levels of granularity regarding the portion of scanning surface 302 illuminated by the lamps. In some embodiments, only the lamps directly beneath the object being scanned will be turned on to prevent obscuring any remaining portions of the surface during the scanning process.

Scanner 300, which includes the mirrors, lens, filters, CCD array, lamps, and so on, moves across the underside of scanning surface 302 by a belt that is attached to a stepper motor. Scanner 300 is attached to stabilizer bars 304 to ensure that there is no wobble or deviation as the scanner passes beneath scanning surface 302. As scanner 300 passes beneath an object placed on scanning surface 302, the image of the object is reflected through a series of mirrors onto a lens. The lens splits the image into three smaller versions of the original. Each smaller version passes through a color filter, which is either red, green, or blue, onto a discrete section of the CCD array. Scanner 300 then combines the data from the three parts of the CCD array into a single full-color image.

Although scanner 300 is described above using CCD technology, other scanning technologies may also be useful in embodiments of the present invention. For example, a scanner in some embodiments may be implemented using contact image sensor ('CIS') technology. CIS technology replaces the CCD array, mirrors, filters, lamp and lens with rows of red, green and blue light emitting diodes ('LEDs'). The image sensor mechanism, consisting of hundreds or thousands of individual sensors spanning the width of scanning surface 302, is placed very close to scanning surface 302 on which the object rests. When the object is scanned, the LEDs combine to provide white light. The illuminated image of the object is then captured by the row of sensors. Still further, readers will appreciate that other scanning technologies may be used. The CCD scanner and the CIS scanner described above are for explanation only and not for limitation.

Scanning computer 308 comprises layer detection module 312. In one embodiment, scanning computer 308 is an example of data processing system 200 in FIG. 2. Layer detection module 312 in scanning computer 308 comprises software for detecting the presence of layers within the document to be scanned. Layer detection module 312 may comprise any known layer detection technology, including existing lighting and depth edge detection technology. Layer detection module 312 may detect the shadows created by the lighting and depth edge detection technology to identify the different layers within a document for scanning. Layer detection module 312 (or scanning software in data processing system 200 in FIG. 2) may be configured to identify each of the individual layers or configured to identify only specific layers of the document for scanning. Layer detection module 312 and scanning software in data processing system 200 in FIG. 2 may also be configured to identify the layers for scanning in a particular order or in particular grouping of layers.

It should be appreciated that FIGS. 1-3 are only exemplary and are not intended to assert or imply any limitation with regard to the environments in which different embodiments may be implemented. Many modifications to the depicted environments may be made.

Figure 4A:
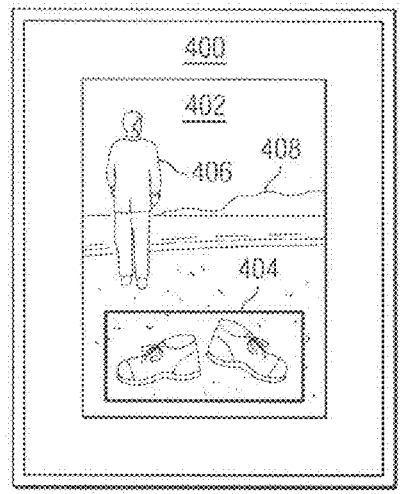
FIGS. 4A-4B illustrate a scanning surface for capturing digital images of a document based on layer detection in accordance with the illustrative embodiments.
Figure 4B:
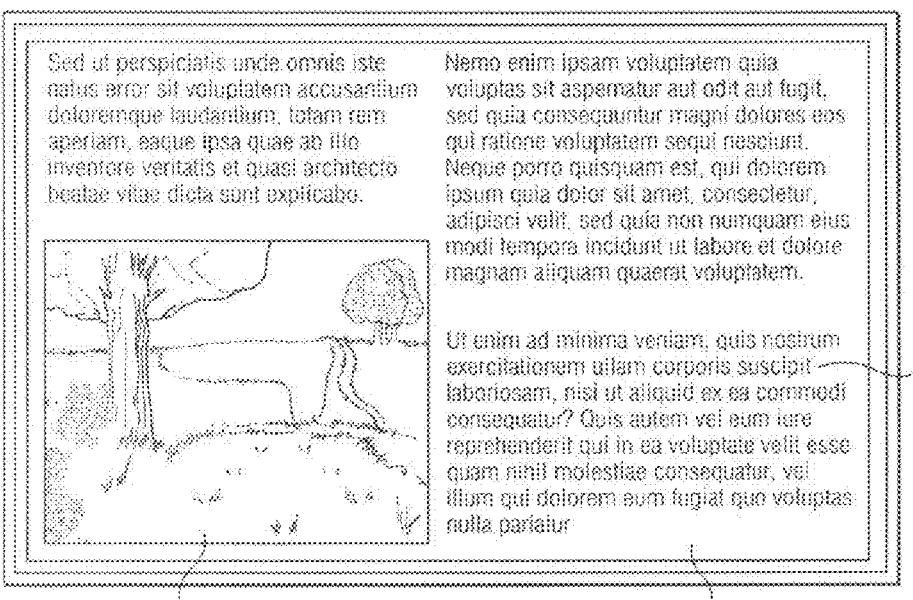

FIGS. 4A and 4B illustrate a scanning surface for capturing digital images of a document based on layer detection in accordance with the illustrative embodiments. The scanning surface is an example of scanning surface 302 in scanner 300 in FIG. 3. The scanner uses layer detection module 312 in FIG. 3 to segregate layers within a document placed on scanning surface 302. A layer is an area of a document which comprises features having a particular depth of field, color, or content. The scanner may capture a portion of the document corresponding to a particular layer, or, if the entire document is to be scanned, on a layer by layer basis. Scanner 300 in FIG. 3 comprises a layer detection module that identifies different layers within a document using any known layer detection technology, such as multi-flash imaging. The layer detection module informs the scanning software loaded in memory in the data processing system (or in the layer detection module itself) that the document to be scanned comprises different layers. The scanning software may be configured by the user to define how the scanning software should interpret the different layers in the document. For instance, the scanning software may scan the individual layers separately and store the images as separate files in memory. Alternatively, the scanning software may be configured to scan only specific portions or layers of the document as indicated by the user.

In FIG. 4A, document 402 to be scanned is shown placed on scanning surface 400 (i.e., viewed from the underside of scanning surface 400). The layer detection module comprising any known layer detection technology detects the various layers on document 402. Other tools such as computational photography may be employed to generate documents for scanning that comprise suitable depth edges to enable the detection of document layers. The scanning software may be configured by the user to define how the scanning software should scan the various layers within a document. In this illustrative example, the layer detector determines that there are three layers a foreground layer 404 (shoes), a mid layer 406 (person), and a background layer 408 (rock formation). Once the layer detector identifies the different layers within document 402, the scanning software automatically scans and captures the individual layers of the document into separate image files. The scanning software may also capture only a particular layer within document 402 as desired by the user. For instance, the scanning software may scan only foreground layer 404, mid layer 406, or background layer 408 based on the configuration settings set by the user.

In addition to using depth of field edges to separate a document into individual layers, the scanning software may also separate the document into individual layers based on color variations in the document. A UV application may analyze the wavelengths of light reflected from document 402 to be scanned. The scanning software then scans a portion of document 402 corresponding to an identified color wavelength, and stores the scanned image as a digital file. The scanning software repeats the scanning process for each of the color wavelengths identified by the UV application in the document. In an alternative embodiment, the scanning software may be configured to scan only those portions of document 402 that the UV application has identified as comprising a color of a desired wavelength.

The scanning software may also separate the document into individual layers based on the types of content within the document. As shown in FIG. 4B, document 410 comprises both text content 412 and graphical content 414. The scanning software may be configured to scan text content 412 of document 410 separately from graphical content 414. Consequently, separate digital images for document 410 may be created and stored in memory, wherein one file contains the text in document 410, and the other file contains the graphics in document 410.

Figure 5:
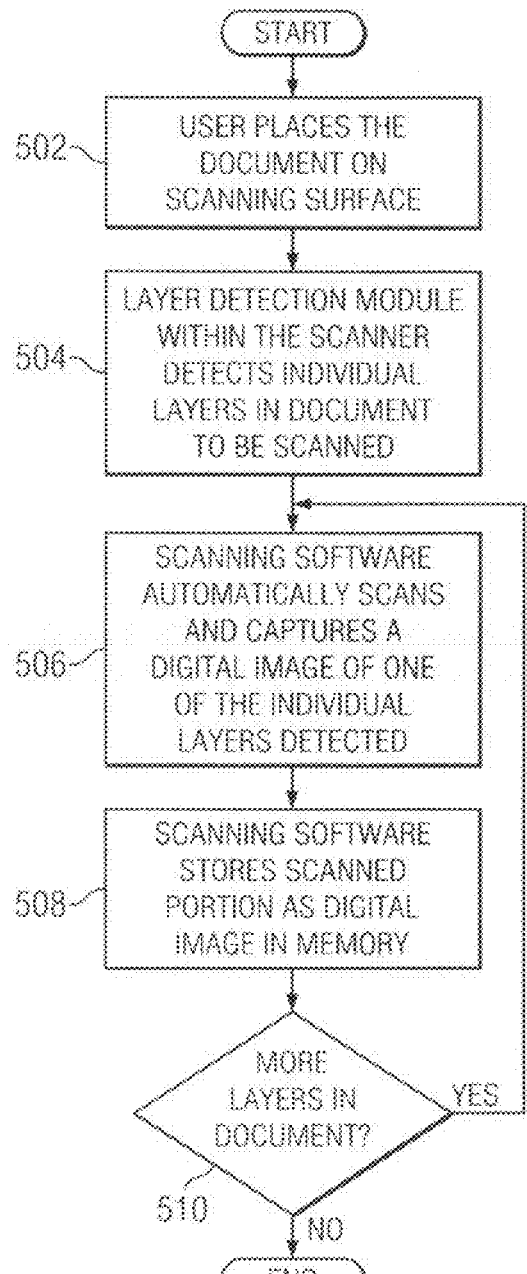
FIG. 5 is a flowchart of a process for capturing a digital image of a document based on layer detection in accordance with the illustrative embodiments.

FIG. 5 is a flowchart of a process for capturing a digital image of a document based on layer detection in accordance with the illustrative embodiments. The process begins with a user placing the document to be scanned onto the scanning surface of the scanner, such as scanner 300 in FIG. 3 (step 502). A layer detection module within the scanner detects the individual layers in the document to be scanned (step 504). The layer detection module may detect the individual layers in the document based on depth of field, color variations, or document content. The scanning software loaded into memory in data processing, system 200 in FIG. 2 (or in the layer detection module depending upon the particular implementation) then automatically scans and captures a digital image of one of the individual layers detected (step 506). The scanned portion is then stored as a digital image in memory (step 508).

A determination is then made as to whether the document contains any more layers to process (step 510). If the document contains additional layers to process ('yes' output of step 510), the process loops back to 506 wherein the scanning software automatically scans the next layer. The process is repeated for each layer detected in the document. If all of the layers detected in the document have been scanned ('no' output of step 510), the process terminates thereafter.

In an alternative embodiment, the user may configure the scanning software to automatically scan only a particular layer of the document based on settings configured by the user. For instance, the user may specify that the scanning software should only scan and capture the foreground layer of the document or the layer of the document that comprises a particular color. In another embodiment, the scanning software may prompt the user to manually select which particular layer the user wants the scanner to capture. The scanned portion is then stored as a digital image in memory with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for scanning a document, the computer implemented method comprising:
    detecting a document placed on a scanning surface of a scanning device; identifying a plurality of layers within the document using depth edge detection; and scanning, by the scanning device, the plurality of layers within the document on a layer by layer basis;
    wherein each of the plurality of layers comprises a specific unique depth of field in the document that is different from other depths of field for other layers of the plurality of layers.

2. The computer implemented method of claim 1, further comprising:
    storing each scanned layer as a separate file in memory.

3. The computer implemented method of claim 1, wherein identifying a plurality of layers within the document further comprises: detecting lighting variations within the document; and associating each detected lighting variation to a particular layer in the one or more layers within the document.

4. The computer implemented method of claim 1, wherein each of the plurality of layers comprises a specific unique color in the document that is different from other colors for other layers of the plurality of layers.

5. The computer implemented method of claim 4, wherein identifying a plurality of layers within the document further comprises:
    detecting wavelengths of light reflected from the document; and
    associating each detected wavelength of light to a particular layer in the plurality of layers within the document.

6. The computer implemented method of claim 1, wherein each of the plurality of layers comprises a specific unique type of content in the document that is different from other types of content for other layers of the plurality of layers.

7. The computer implemented method of claim 6, wherein identifying a plurality of layers within the document further comprises:
    detecting various types of content within the document;
    associating each detected type of content to a particular layer in the one or more layers within the document.

8. A data processing system for scanning a document the data processing system comprising:
    a bus;
    a storage device connected to the bus, wherein the storage device contains computer usable code; and a processing unit connected to the bus, wherein the processing unit executes the computer usable code to detect a document placed on a scanning surface of a scanning device; identify a plurality of layers within the document using depth edge detection; and scan the plurality of layers within the document on a layer by layer basis;

Wherein each of the plurality of layers comprises a specific unique depth of field in the document that is different from other depths of field for other layers of the plurality of layers.

9. A Non-Transitory computer program product for scanning a document, the computer program product comprising:
  a tangible computer usable storage device having computer usable program code stored thereon, the computer usable program code comprising:
  computer usable program code for detecting a document placed on a scanning surface of a scanning device;
  computer usable program code for identifying a plurality of layers within the document using depth edge detection; and
  computer usable program code for scanning the plurality of layers within the document on a layer by layer basis;
  wherein each of the plurality of layers comprises a specific unique depth of field in the document that is different from other depths of field for other layers of the plurality of layers.

10. The computer program product of claim 9, further comprising:
  computer usable program code for storing each scanned layer as a separate file in memory.

11. The computer program product of claim 9 wherein the computer usable program code for identifying a plurality of layers within the document further comprises: computer usable program code for detecting lighting variations within the document; and computer usable program code for associating each detected lighting variation to a particular layer in the plurality of layers within the document.

12. The computer program product of claim 9, wherein each of the plurality of layers comprises a specific unique color in the document that is different from other colors for other layers of the plurality of layers.

13. The computer program product of claim 12, wherein the computer usable program code for identifying a plurality of layers within the document further comprises:
  computer usable program code for detecting wavelengths of light reflected from the document; and
  computer usable program code for associating each detected wavelength of light to a particular layer in the one or more layers within the document.

14. The computer program product of claim 9, wherein each of the plurality of layers comprises a specific unique type of content in the document that is different from other types of content for other layers of the plurality of layers.

15. The computer program product of claim 14, wherein the computer usable program code for identifying a plurality of layers within the document further comprises:
  computer usable program code for detecting various types of content within the document;
  computer usable program code for associating each detected type of content to a particular layer in the one or more layers within the document.

16. The computer program product of claim 9, wherein the computer usable program code is stored in a computer readable storage medium in a data processing system, and wherein the computer usable program code is downloaded over a network from a remote data processing system.

17. The computer program product of claim 9, wherein the computer usable program code is stored in a computer readable storage medium in a server data processing system, and wherein the computer usable program code is downloaded over a network from a remote data processing system for use in a computer readable storage medium with the remote system.

* * * * *